United States Patent [19]

Tadokoro et al.

[11] Patent Number: 4,589,764
[45] Date of Patent: May 20, 1986

[54] LASER BEAM PRINTER CONTROL APPARATUS

[75] Inventors: Hiroyuki Tadokoro; Kenichi Akahori, both of Hitachi, Japan

[73] Assignee: Hitachi, Ltd., Tokyo, Japan

[21] Appl. No.: 662,941

[22] Filed: Oct. 19, 1984

[30] Foreign Application Priority Data

Oct. 19, 1983 [JP] Japan ............................... 58-194176

[51] Int. Cl.4 ...................... G03G 15/00; G01D 15/06
[52] U.S. Cl. .............................. 355/14 R; 355/14 FU; 219/216; 346/160.1
[58] Field of Search ............... 355/3 FU, 14 FU, 3 R, 355/14 R; 219/216; 358/285, 300; 346/160, 160.1

[56] References Cited

U.S. PATENT DOCUMENTS

| | | | |
|---|---|---|---|
| 3,995,110 | 11/1976 | Starkweather | 350/6.8 X |
| 4,205,348 | 5/1980 | De Benedictis et al. | 358/285 |
| 4,205,350 | 5/1980 | Gunning | 355/8 X |
| 4,308,544 | 12/1981 | Lucero et al. | 346/108 |
| 4,383,755 | 5/1983 | Fedder et al. | 355/8 X |
| 4,384,297 | 5/1983 | Ohara et al. | 346/108 |
| 4,408,871 | 11/1983 | Kojima | 358/300 X |
| 4,497,568 | 2/1985 | Komiya et al. | 355/14 FU X |

Primary Examiner—Arthur T. Grimley
Assistant Examiner—C. Romano
Attorney, Agent, or Firm—Antonelli, Terry & Wands

[57] ABSTRACT

A laser beam printer operatively responsive to a printing signal fed from a host control unit includes a printing unit for executing a xerographic process, a laser beam scanning unit, a fusing unit, a process control unit for controlling said printing unit, the laser beam scanning unit, and the fusing unit, and a signal processing unit for receiving the printing signal from the host control unit. When the host control unit begins to supply a printing signal to the signal processing unit, the signal processing unit supplies a provisional start signal to the process control unit. Upon receiving the provisional start signal, the process control unit controls the printing unit, the scanning unit, and the fusing unit to bring them into a ready state.

6 Claims, 7 Drawing Figures

LASER BEAM PRINTER CONTROL APPARATUS

The present invention relates to a laser beam printer control apparatus and in particular to a control apparatus which is suitable for controlling a laser beam scanning unit or a heat fusing unit into the wait state or ready state.

In the laser beam printer, exposure in a xerography process is effected by using a laser beam which has been modulated by a printing signal. Thus, the laser beam printer is favorable for recording an image which has been processed in the electrical signal form. Such a laser beam printer has heretofore been improved by a number of people and disclosed in a number of patents. For example, improvements have been disclosed in the U.S. Pat. No. 3,995,110 by Starkweather, U.S. Pat. No. 4,205,348 by DeBenedictis et al., U.S. Pat. No. 4,205,350 by Gunning, U.S. Pat. No. 4,308,544 by Lucero et al., U.S. Pat. No. 4,383,755 by Fedder et al., and U.S. Pat. No. 4,384,297 by Ohara et al.

As apparatuses utilizing the xerography process, electrophotographic copying machine are well known. However, laser beam printers are largely different from electrophotographic copying machines in use forms and exposure means.

Problems of laser beam printers caused by the difference in the use forms will now be described. One of the use forms is the use method. Whereas the copying machine is directly operated by an operator, the laser beam printer is operated by a host computer or the like via a telephone line and/or a local area network. Although the power switch for the electrophotographic copying machine can be turned on when the machine is to be used, the power supply to the above described laser beam printer used as a computer terminal must be always turned on. However, keeping always a printer having a heat fusing unit in its operation state results in uneconomical increase in power consumption.

Problems caused by difference between a conventional copying machine and a laser beam printer in exposure unit among xerography processing system means will now be described. Whereas lamps, lenses and carriages are generally included in most copying machine an exposure unit, a laser light source, lenses and a beam scanning unit are included in a laser beam printer. The scanning unit must have extremely high stability in its operation. In a rotary polygon mirror which is revolving at high speed, for example, unevenness in revolution must be suppressed as far as possible. After the scanning unit is energized, therefore, it takes quite a time for the revolution to attain serviceable stability. As compared with a copying machine capable of operating immediately, therefore, time required for xerography recording and processing of the first page (hereafter referred to as first print time) becomes longer in the laser beam printer. If power is always supplied to the scanning unit in order to reduce the first print time, the consumed power is increased and the rotary components are rapidly worn away, resulting in a short life.

An object of the present invention is to provide a laser beam printer control apparatus capable of reducing the power consumption by efficiently controlling components consuming a larger part of the consumed power and capable of shortening the first print time.

In accordance with the present invention, in a laser beam printer including printing process execution means for executing the xerography process, process control means for controlling the printing process execution means, and signal processing means for receiving, analyzing and decoding a printing signal fed from the outside of the laser beam printer and for supplying a printing start signal to said process control means upon receiving printing start data, there is provided a laser beam printer control apparatus in which the signal processing means comprises provisional start signal producing means for supplying a provisional start signal to the process control means irrespective of contents of the printing signal upon receiving the printing signal from the outside, and the process control means comprises means, responsive to the supplied provisional start signal, producing control signals for starting the operation of the scanning unit and the fusing unit, and comprises means producing other control signals for stopping the operation of the scanning unit and stopping the operation of the fusing unit or changing a preset temperature of the fusing unit to the wait state temperature, provided that the printing start signal is not supplied within a preset time after the application of the provisional start signal or a next printing start signal is not supplied within another preset time after the printing termination. Thus, the scanning unit and fusing unit are activated efficiently, resulting in reduced power consumption and shortened first print time.

The present invention will be apparent from the following detailed description taken in conjunction with the accompanying drawings, in which.

Figure 1:
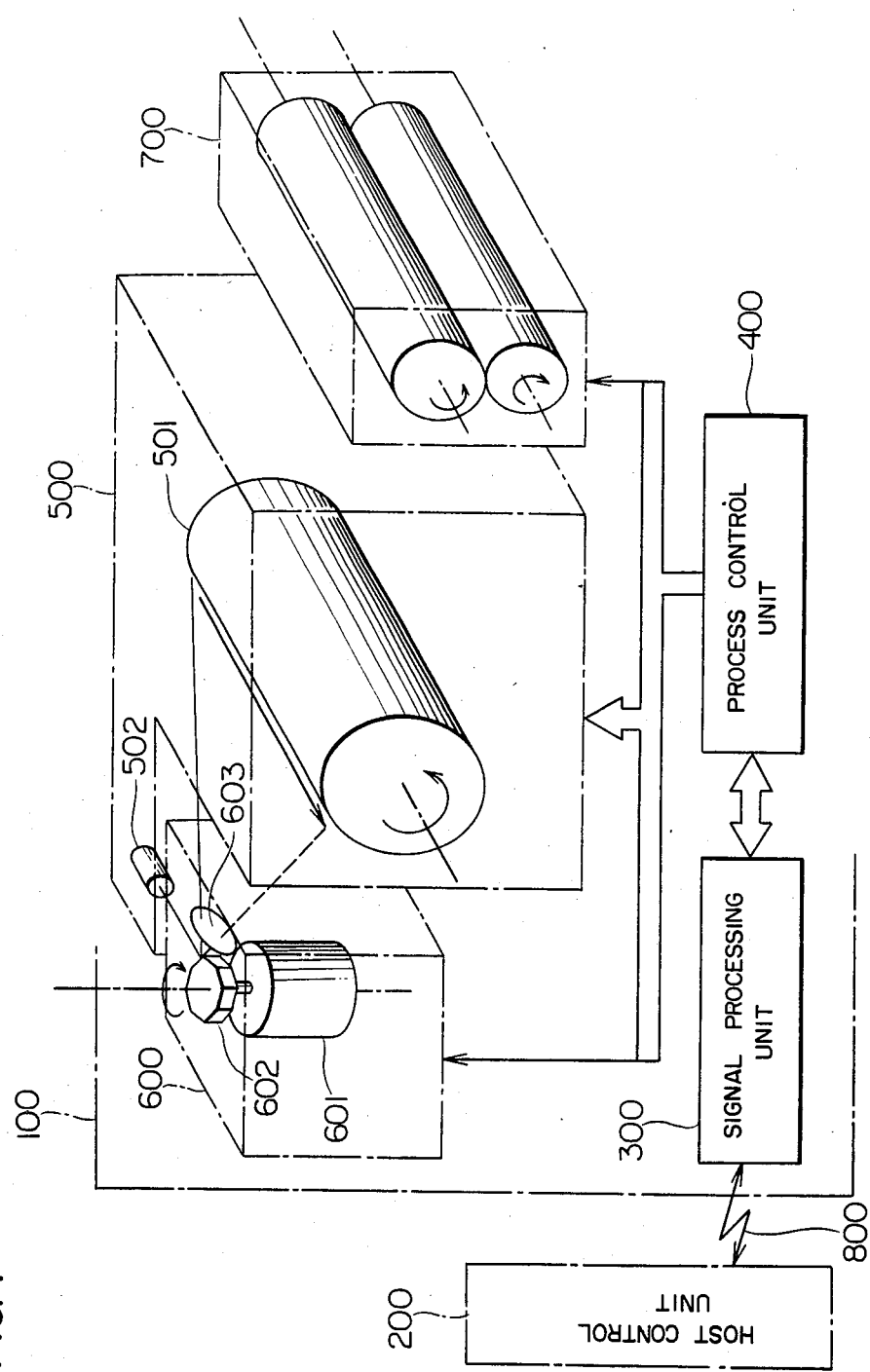
FIG. 1 is an entire block diagram of an embodiment of a laser beam printer according to the present invention.
Figure 2:
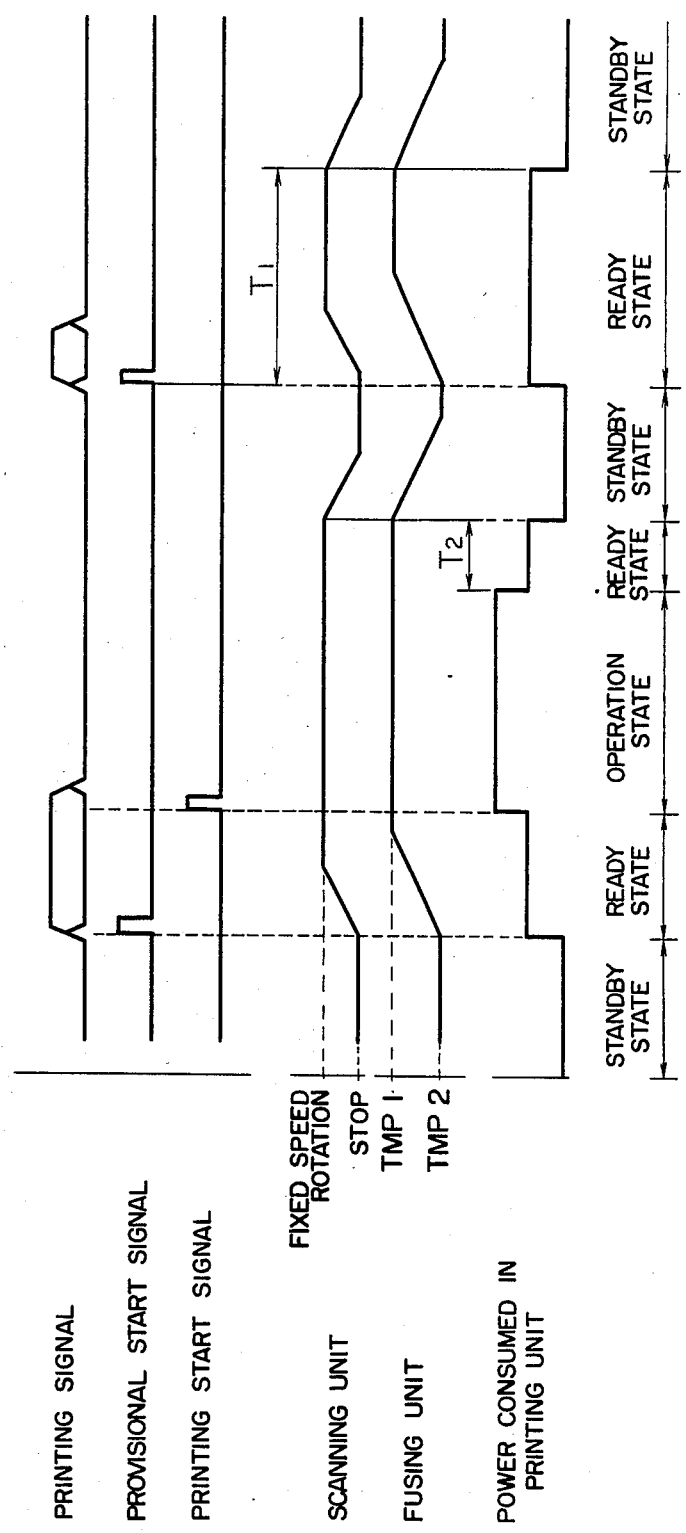
FIG. 2 is an operation timing chart of the laser beam printer illustrated in FIG. 1.

As illustrated in FIG. 1, a laser beam printer 100 is connected to an external host control unit 200 via a signal line 800. A signal processing unit 300 receives a printing signal from the host control unit 200 via the signal line 800. As illustrated in FIG. 2, the signal processing unit 300 transmits a provisional start signal to a process control unit 400 when the unit 300 has begun to receive the printing signal. The signal processing unit 300 also transmits a printing start signal to the process control unit 400 when the printing signal has been recognized as printing start data as a result of analyzing and interpreting the printing signal.

The process control unit 400 is so configured as to control xerography process loads to be controlled as illustrated in FIG. 2. The loads are composed of a printing unit 500, a scanning unit 600, and a fusing unit 700. And the printing unit 500 includes a photosensitive drum 501, an electrifier, a laser light source 502, a development unit, a transfer unit, a charge remover, a cleaning unit, and a paper feed unit. The scanning unit 600 includes a rotary polygon mirror 602, which is rotated by a motor 601, and a lens 603. The fusing unit 700 includes a fixation heater. The concrete configuration of these loads to be controlled is realized in the same way as the apparatuses of the prior art disclosed in the aforementioned U.S. patents and is not described further in detail.

In a state that the laser beam printer 100 receives no printing signal from the host control unit 200, i.e., in a state that the printing start signal or the provisional start signal from the signal processing unit 300 is not applied to the process control unit 400, the process control unit 400 produces control signals for stopping the printing unit 500, for controlling the temperature of the fusing unit 700 to set it to an economical standby temperature TMP2, and for keeping the scanning unit 600 stopped. The control of the standby temperature may be effected by turning off power to the fusing unit 700. This state is referred to as a standby state.

If the host control unit 200 begins to send out the printing signal and the signal processing unit 300 receives the printing signal while the laser beam printer 100 is in the standby state, the signal processing unit 300 transmits the provisional start signal to the process control unit 400. Upon receiving the provisional start signal, the process control unit 400 controls the printing unit 500 so that it will proceed to a stage preceding the exposure step in the xerography process, i.e., a stage after the charge removal step, cleaning step, and electrifying step have been applied to the photosensitive drum 501 in the xerography process. The process control unit 400 also starts the operation of the rotary polygon mirror in the scanning unit 600 and controls the motor 601 so that the rotary polygon mirror may rotate at a constant speed. The process control unit 400 also produces a control signal for controlling the temperature of the fusing unit 700 to set it to a fusing operation temperature TMP1. Thus, the laser beam printer 100 is ready for producing a latent image. This state is referred to as ready state. If the above described printing signal fed from the host control unit 200 contains printing start data in the ready state, the signal processing unit 300 produces the printing start signal. Upon receiving the printing start signal, the process control unit 400 begins to produce a latent image and promotes steps of development, transfer, and fusing to complete printing. This state is referred to as operation state.

After the operation state, the process control unit 400 returns to the aforementioned ready state. Thus, the printing unit 500, the scanning unit 600, and the fusing unit 700 are maintained to be ready for immediately producing a latent image provided that consecutive printing start data are transmitted by the host control unit 200. If the provisional start signal or printing start signal is not produced by the signal processing unit 300 when a preliminary time T2 has elapsed after the transition from the operation state to the ready state, the process control unit 400 controls the printing unit 500, scanning unit 600, and fusing unit 700 to return them to the standby state.

If the printing start signal is not supplied from the signal processing unit 300 to the process control unit 400 when a preparation time T1 has elapsed after the transition of the control state of the process control unit 400 from the standby state to the ready state, the printing unit 500, scanning unit 600 and fusing unit 700 are controlled to standby to the above described wait state. The preparation time T1 and the preliminary time T2 are wait periods for the next operations and can be arbitrarily set.

The above described signal processing unit 300 and process control unit 400 are realized by microcomputers.

Figure 3:
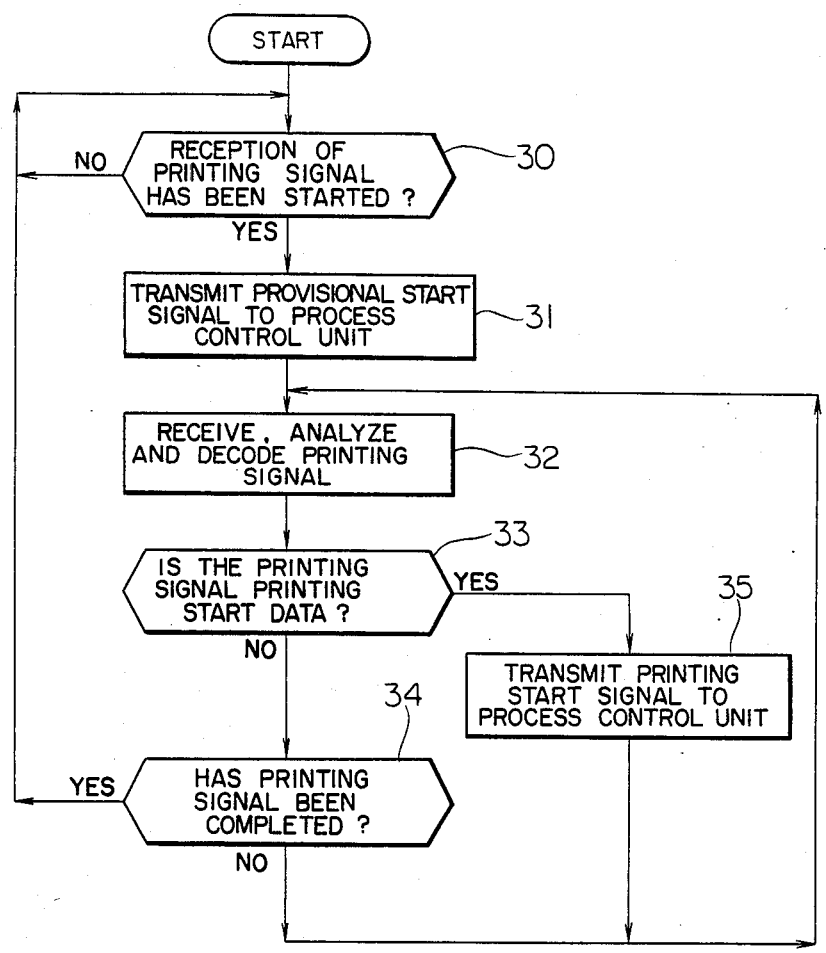
FIG. 3 is a flow chart of a signal processing unit.

As illustrated in FIG. 3, the microcomputer in the signal processing unit 300 checks whether reception of the printing signal from the external host control unit 200 has been started or not at a processing step 30. If the signal processing unit 300 has received the printing signal, the unit 300 produces the provisional start signal and transmits it to the process control unit 400 at a processing step 31. The signal processing unit 300 then receives (stores) the printing signal and analyzes and decodes it at a processing step 32. The microcomputer in the signal processing unit 300 checks whether the printing signal is the printing start data or not at a processing step 33. If the printing signal is not recognized as the printing start data at the processing step 33, the microcomputer in the signal processing unit 300 checks whether the printing signal has not been completed or not at a processing step 34. Unless the printing signal has been completed, the microcomputer in the signal processing unit 300 returns to the processing step 32. If the printing signal has been completed, the microcomputer in the signal processing unit 300 returns to the processing step 30. If the printing signal is recognized as the printing start data at the processing step 33, the microcomputer in the signal processing unit 300 produces the printing start signal and transmits it to the process control unit 400 at a processing step 35.

Figure 4:
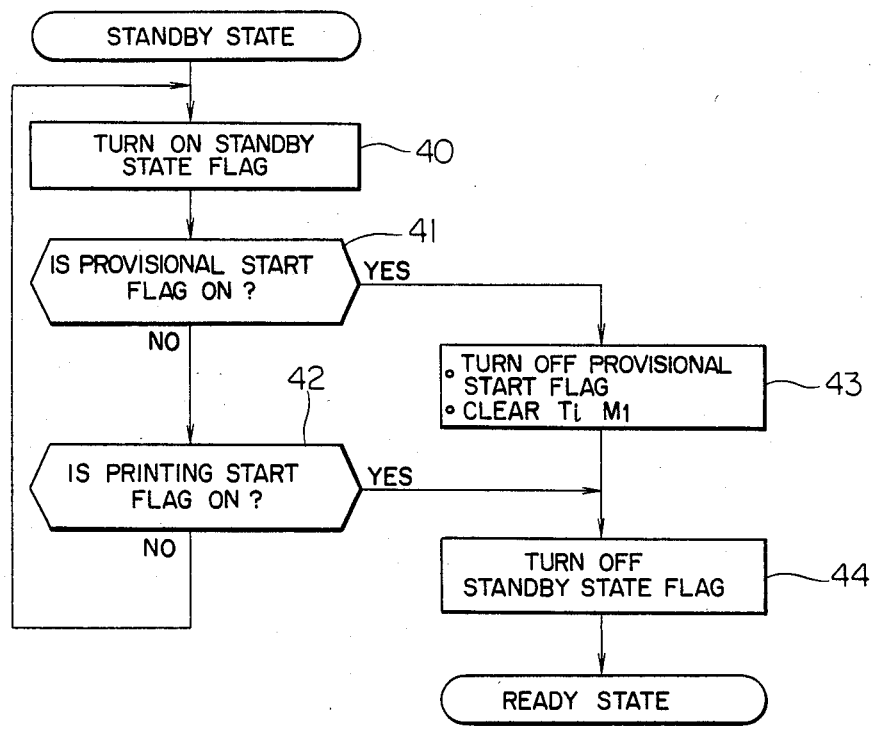
FIG. 4 to FIG. 7 are flow charts of a process control unit.
Figure 5:
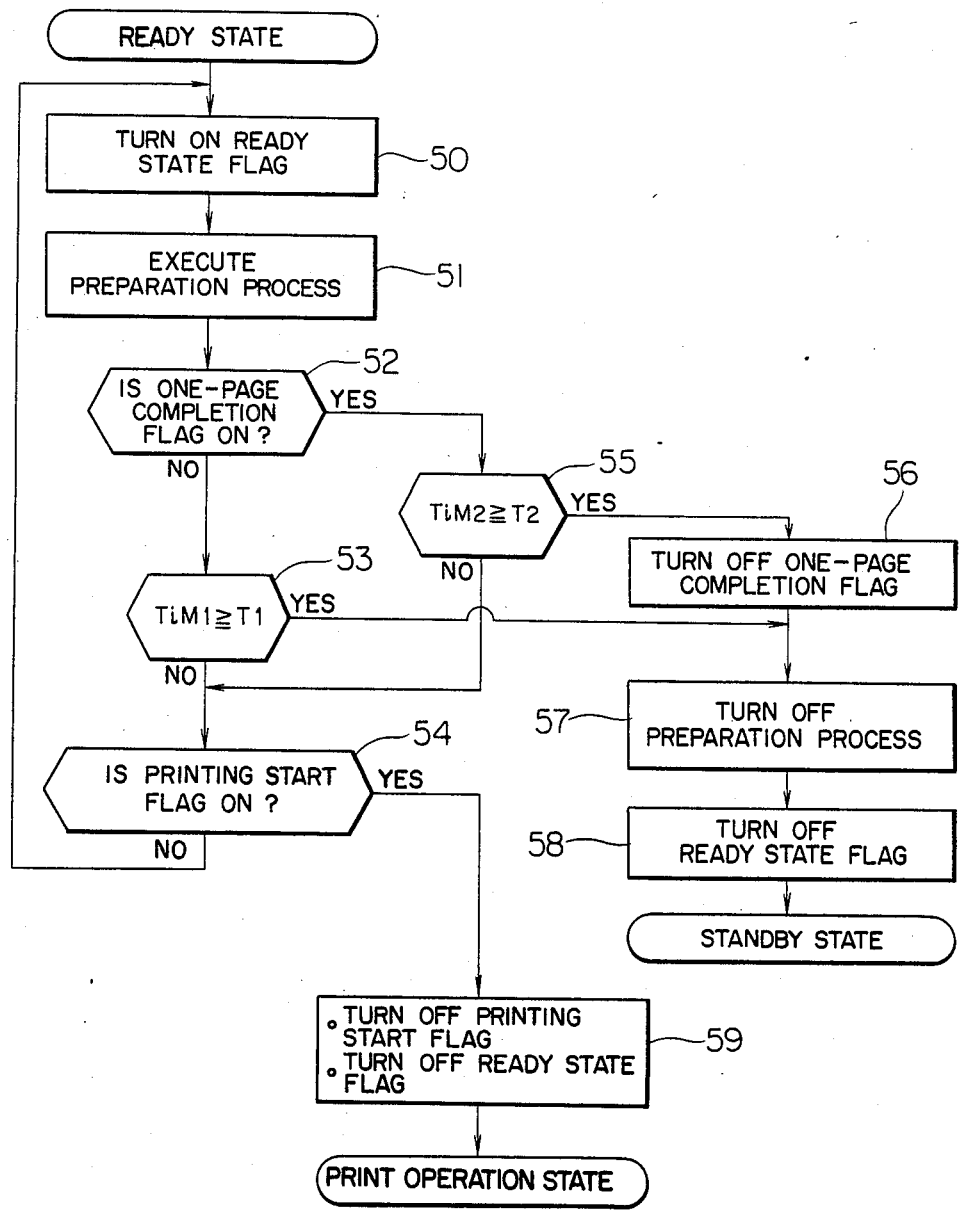
Figure 6:
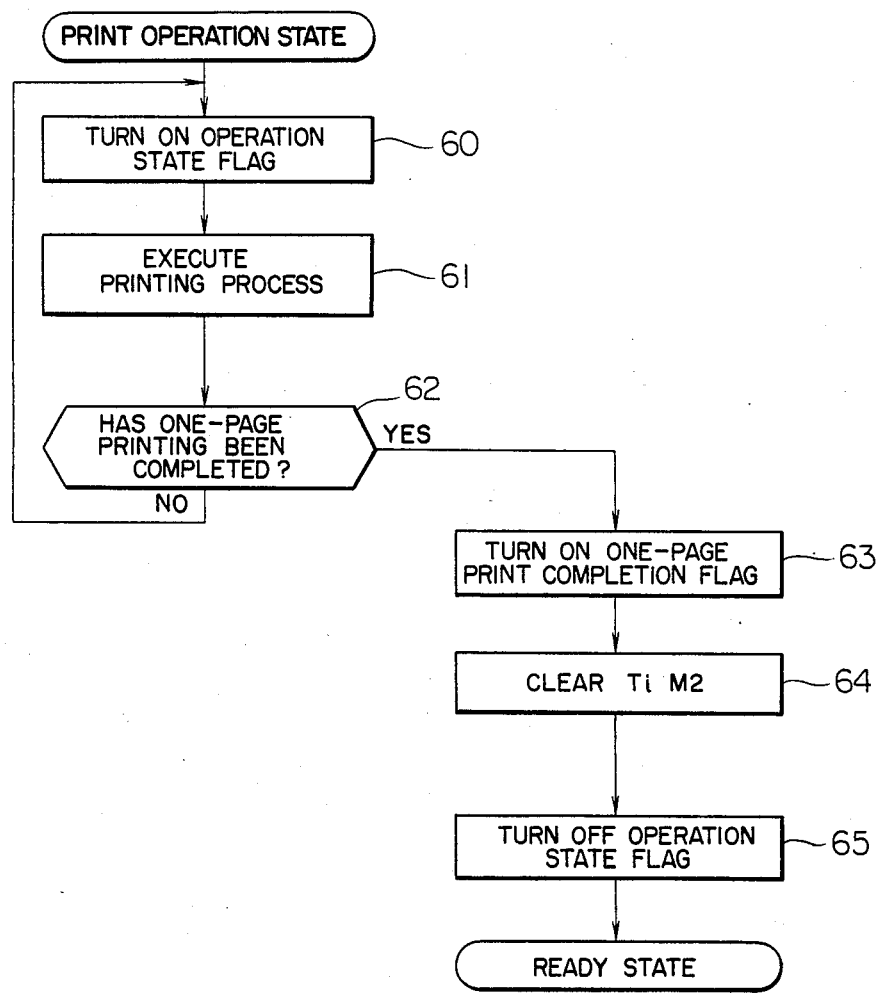
Figure 7:
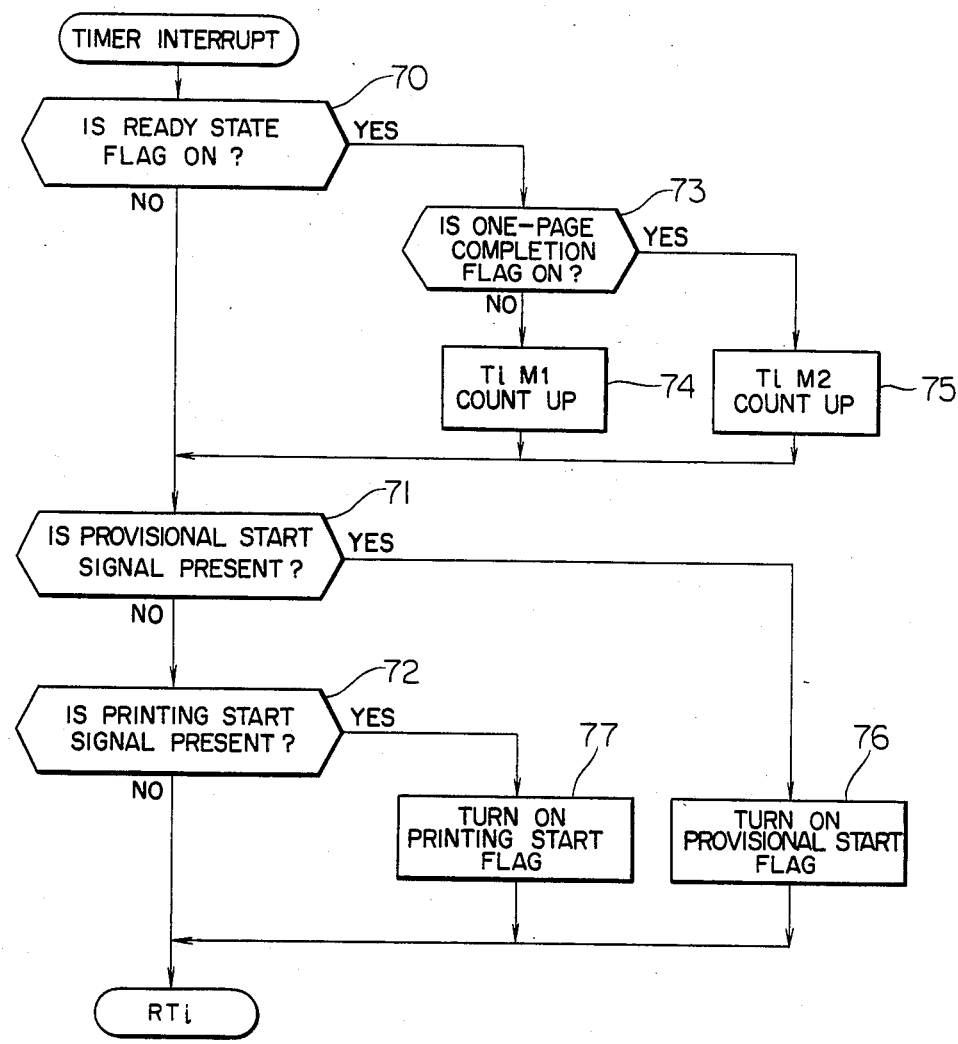

The microcomputer in the process control unit 400 carries out signal processing steps as shown in FIG. 4 to FIG. 7. FIG. 4 to FIG. 6 illustrate main control processing flows. FIG. 7 shows a timer interrupt processing flow for the main control processing flows. When the power supply to the laser beam printer 100 is turned on, the process control unit 400 passes into a state for producing control signals which bring the printing unit 500, the scanning unit 600, and the fusing unit 700 into the standby state. Also the microcomputer in the process control unit 400 turns ON a standby state flag at a processing step 40 as illustrated in FIG. 4. Then the microcomputer checks whether a provisional start flag is ON or not at a processing step 41. If the provisional start flag is not ON, the microcomputer checks whether a printing start flag is ON or not at a processing step 42. If the printing start flag is not ON, the microcomputer in the process control unit 400 returns to the processing step 40. If the provisional start flag is found to be ON at the processing step 41, the provisional start flag is turned OFF and a timer TiM1 is cleared at a processing step 43. When the processing step 43 has been completed, or if the printing start flag is found to be ON at the processing step 42, the microcomputer in the process control unit 400 turns OFF the standby state flag at a processing step 44 and then passes into the ready state control flow.

In the ready state control flow illustrated in FIG. 5, the microcomputer in the process control unit 400 turns ON a ready state flag at a processing step 50 and then executes a preparation process at a processing step 51. In the preparation process, control signals are produced to bring the printing unit 500, the scanning unit 600, and the fusing unit 700 into a printable state. The microcomputer in the process control unit 400 then checks whether a print completion flag for one page is ON or not at a processing step 52. If the print completion flag for one page is ON, it is checked at a processing step 53 whether the time indicated by the timer TiM1 has reached a preset value T1 or not. If the timer TiM1 has not reached T1, it is checked at a processing step 54 whether a printing start flag is ON or OFF. If the printing start flag is OFF, the microcomputer in the process control unit 400 returns to the processing step 50.

If the completion flag is found to be ON at the processing step 52, it is checked at a processing step 55 whether the time indicated by the timer TiM2 has reached a preset value T2 or not. If the time has not reached the value T2, the microcomputer in the process control unit 400 passes to the processing step 54. If the time indicated by the timer TiM2 has reached the value T2, the microcomputer passes to a processing step 56 to turn OFF the one-page print completion flag.

If the time indicated by the TiM1 has reached the preset time T1, or if the processing step 56 has been completed, the microcomputer in the process control unit 400 passes to a processing step 57. This processing step 57 is provided for stopping the preparation process executed at the processing step 51. At the processing step 51, control signals are sent out to bring the printing unit 500, the scanning unit 600, and the fusing unit 700 into the standby state. After the processing step 57, the ready state flag is turned OFF at a processing step 58, resulting in the above described standby state.

If the printing start flag is found to be ON at the processing step 54, the microcomputer in the process control unit 400 passes into a processing step 59, where the printing start flag and the ready state flag are turned OFF. Thus, the microcomputer in the process control unit 400 passes into a print operation state.

After passing into the print operation state, the process control unit 4 turns ON an operation state flag at a processing step 60 to pass into a processing step 61 as indicated in FIG. 6. By the control effected at this processing step 61, the printing process is carried out and the printing data is printed out. At a processing step 62, it is checked whether one-page printing has been completed or not. If the one-page printing has not been completed, the microcomputer in the process control unit 400 returns to the processing step 60 to continue the printing process. If the one-page printing has been completed, the one-page print completion flag is turned ON at a step 63. Thereafter, the timer TiM2 is cleared at a processing step 64 and the operation state flag is turned OFF at a processing step 65, resulting in the above described ready state.

The timers TiM1 and TiM2 comprise counters. Counting up in the timers TiM1 and TiM2 and turning ON the provisional start flag and the printing start flag are carried out by the timer interrupt processing as shown in FIG. 7. In the timer interrupt processing, it is checked at a processing step 70 whether the ready state flag is ON or OFF. If the ready state flag is OFF, it is checked at a processing step 71 whether the provisional start signal is present or not. If the provisional start signal is not present, it is checked at a processing step 72 whether the printing start signal is present or not. If the printing start signal is not present, the timer interrupt processing is terminated.

If the ready state flag is found to be ON at the processing step 70, it is checked at a processing step 73 whether the one-page print completion flag is ON or OFF. If the one-page print completion flag is OFF, the timer TiM1 counts up at a processing step 74. If the one-page print completion flag is ON, the timer TiM2 counts up at a processing step 75. The processing step 71 follows the processing steps 74 and 75.

If the provisional start signal is found to be present at the processing step 71, the provisional start flag is turned ON at a processing step 76 to terminate the timer interrupt processing.

If the printing start signal is found to be present at the processing step 72, the printing start flag is turned ON at a processing step 77 to terminate the timer interrupt processing.

We claim:

1. A laser beam printer including:
   printing process execution means for conducting a xerographic process, said printing process execution means having a photosensitive member, a laser light source, a scanning unit, and a fusing unit;
   process control means for controlling the operation of said printing process execution means; and
   signal processing means for receiving, analyzing and decoding a printing signal fed from the outside of said printer and for supplying a printing start signal to said process control means upon receiving printing start data, wherein said signal processing means further comprises provisional start signal producing means for supplying a provisional start signal to said process control means irrespective of contents of said printing signal upon starting reception of said printing signal, and said process control means further comprises means, responsive to said provisional start signal, for producing control signals for raising the temperature of said fusing unit to an operation temperature and for starting the operation of said scanning unit, and means for producing other control signals for lowering the temperature of said fusing unit to a value lower than said operation temperature and for stopping the operation of said scanning unit, provided that said printing start signal is not supplied within a preset time after a printing termination or within another preset time after the application of said provisional start signal.

2. A laser beam printer according to claim 1, further comprising host control means coupled to said printer for supplying from the outside of said printer said printing signal to said signal processing means.

3. A laser beam printer according to claim 2, wherein said host control means comprises a computer outside of said printer.

4. A laser beam printer according to claim 2, wherein said means responsive to said provisional start signal for producing control signals for starting the operation of said scanning unit enables said scanning unit to rotate at a constant speed prior to a printing operation.

5. A laser beam printer according to claim 4, wherein said preset time after the printing termination and said another preset time after the application of said provisional start signal are different time periods.

6. A laser beam printer according to claim 4, wherein said preset time after the printing termination is a shorter time period than said another preset time after the application of said provisional start signal.

* * * * *